Feb. 8, 1966     W. KNAPP     3,233,705

DISK BRAKE

Filed June 11, 1964     3 Sheets-Sheet 1

INVENTOR:
WILHELM KNAPP
BY
Mestern, Ross & Mestern

United States Patent Office 3,233,705
Patented Feb. 8, 1966

3,233,705
DISC BRAKE
Wilhelm Knapp, Bad Homburg vor der Hohe, Germany, assignor to Alfred Teves Maschinen- und Armaturenfabrik K.G., Frankfurt am Main, Germany
Filed June 11, 1964, Ser. No. 374,349
Claims priority, application Germany, July 27, 1963,
T 16,308
5 Claims. (Cl. 188—73)

My present invention relates to disk brakes and, more particularly, to so-called segmental disk brakes wherein a rotatable brake disk has a peripheral segment thereof surrounded by a brake-support yoke carrying a pair of brake shoes disposed on opposite sides of the brake disk and displaceable relatively thereto by suitable actuating means into frictional engagement with respective surfaces of the disk.

While it is known to provide disk brakes of the general character described above, one of the principal difficulties of such brakes is that the brake shoes thereof are not readily accessible for replacement or examination and cannot be removed with facility from the yoke. It has, therefore, been proposed hitherto to provide the yoke with generally radial openings through which the brake shoes can be withdrawn or, alternatively, to mount the yoke swingably upon a support which is stationary relative to the axis of the disk so that the entire yoke assembly can be swung away from the disk for examination or replacement of the brake shoes. Systems of this type either call for rather complex mounting means or require that the brake-actuating means be awkardly disposed upon the yoke and cooperate with complex lever arrangements for displacing the brake shoes.

It is, therefore, the principal object of the present invention to provide a disk brake wherein the aforementioned disadvantages can be obviated.

It is a more specific object of this invention to provide an improved disk brake wherein the brake shoes are readily removable and/or are accessible for examination without disassembly of the brake-support yoke or the actuating means.

According to a feature of the present invention, the above and other objects, which will become apparent hereinafter, are attained by providing a disk brake wherein the brake shoes are slidably displaceable upon a pair of guide pins disposed on opposite lateral sides of the rear or back portion of the yoke, one or both pins being removable at least partly from the yoke to release the brake shoes and enable their swinging movement about the remaining pin or their withdrawal from the yoke when both pins are removed in a direction transverse to the axis of rotation of the disk. For this purpose, the brake shoes can be provided with backing plates whose lugs slidably receive the pins while the brake shoes themselves extend radially inwardly of the pin with respect to the axis of rotation of the disk. The brake shoes are, moreover, so dimensioned that they clear both the shaft upon which the disk is mounted and the back portion of the yoke when they are withdrawn from the latter.

More generally speaking, the yoke can be provided with releasable mounting means normally engaging the brake shoes for constraining them to movement in a direction perpendicular to the braking surfaces on opposite sides of the disk and disengageable from the shoes for permitting one or both of them to be withdrawn from the yoke in a direction transverse to the axis and generally parallel to the disk. In this case, the yokes can be immovably mounted with respect to the axis of rotation of the shaft while the brake disk is keyed to the latter for rotatable entrainment therewith but is axially displaceable along the shaft which can be splined for this purpose.

The yoke can, therefore, be provided with actuating means for relatively displacing the brake shoes and the brake disk in a direction perpendicular to the surfaces, i.e. in the axial direction. Preferably, however, the actuating means displaces one of the brake shoes into engagement with the respective braking surface of the brake disk and, upon engagement of this brake shoe with the brake disk, displaces the brake disk axially into engagement with the other or stationary shoe. This arrangement has the decided advantage over earlier diskbrake arrangements that there is no need to displace the yoke with respect to the axis of the shaft, by either swinging it or removing it entirely, to examine the brake shoes and enable their replacement after examination.

As previously mentioned, the braking member of each brake shoe and one of the pin members can define a pivotal axis extending parallel to the axis of rotation of the shaft and disk about which the brake shoes can be swung out of the yoke. The radially innermost edge of the brake shoe can be arcuate, with a curvature so selected that the brake shoe clears the shaft and the back portion of the yoke upon such swinging movement. This back portion of the yoke can thus be free from the openings hitherto required for withdrawal of the brake shoes and may be provided with part of the actuating means, e.g. a fluid-operated (hydraulic) cylinder-and-piston arrangement, for displacing the movable shoe in the direction of the brake disk and the latter toward the immovable shoe. The actuating means can further include a manually displaceable lever or one shiftable only by the fluid-responsive means, this lever being pivotable upon the yoke about an axis generally parallel to the braking surfaces and being engageable with the movable brake shoe, preferably via a self-extensible transmission element adapted to compensate for wear of the brake shoes.

The above and other objects, features and advantages of the present invention will become more readily apparent from the following description, reference being made to the accompanying drawing in which.

Figure 2:
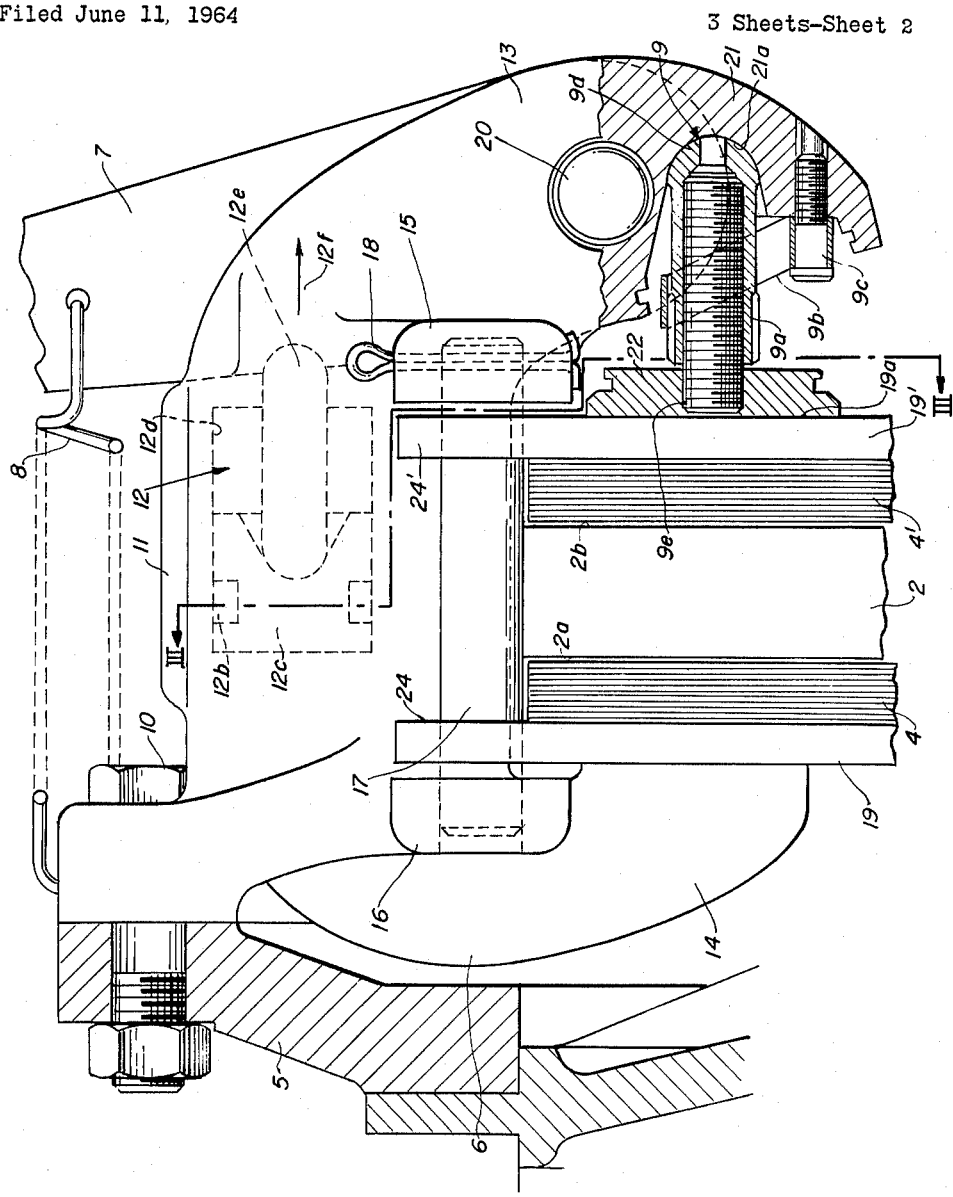
FIG. 2 is a side-elevational view of the disk brake, partly in section.
Figure 3:
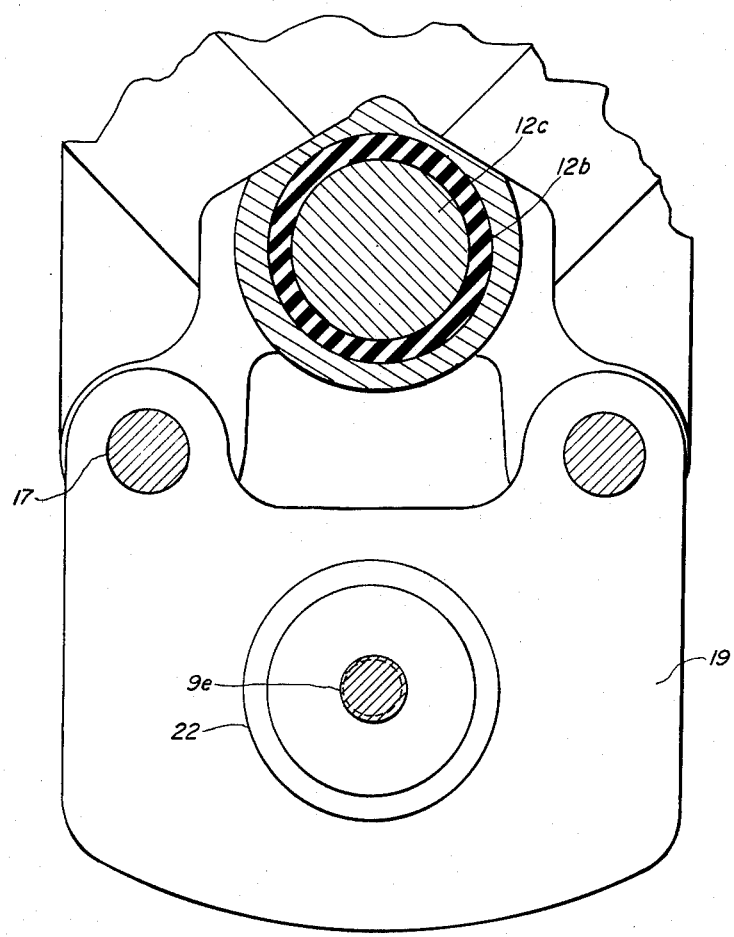
FIG. 3 is a cross-sectional view taken along the line III—III of FIG. 2.

As illustrated in the drawing, a disk brake in accordance with the present invention comprises a shaft 1, rotatable about its axis, to which a brake disk 2 is keyed via splines 3 for axial movement relative to the shaft and rotatable entrainment thereby. A brake-support yoke 6 is mounted by bolts 10 upon a console or base 5, which can be part of a vehicle chassis with respect to which the shaft 1 is journaled. Two brake shoes 4, 4' on opposite sides of the brake disks 2 are engageable with the opposite braking surfaces 2a, 2b of the disk 2 as will become apparent hereinafter. A manually displaceable lever 7, to which a restoring spring 8 is anchored, acts upon the movable brake shoe 4' via a transmission element generally designated 9. The brake yoke 6 extends around the periphery of the disk 2 and has a bight portion 11 which extends parallel to the axis of the shaft 1 and is provided with a fluid-pressure means generally designated 12. The latter can include a fluid cylinder 12d supplied with hydraulic fluid in the usual manner, in which a piston 12c is displaceable in the direction of arrow 12f. The piston 12c acts upon the lever 7 via a bar 12e and has sealing rings 12b (FIG. 2).

The yoke 6 has a pair of arms 13, 14 laterally offset from the disk 2 and extending along the opposite sides thereof. These arms are each formed with a respective pair of lugs 15 and 16 extending parallel to the braking surfaces of the disk, the corresponding lugs of each pair being axially aligned and having bores receiving respective guide bolts 17, the latter being removable from these bores but temporarily held in place via respective cotter pins 18. As will be particularly apparent from FIG. 2, the bolts 17 are freely accessible and can be slid out axially (e.g. to the left) upon removal of the cotter pins. The brake shoes 4 and 4′ are respectively provided with backing plates 19, 19′ whose eyelets or lugs 24, 24′ slidably receive the pins 17, which constrain the brake shoes to movement in the axial direction relative to the brake disk 2.

Arm 13 of yoke 6 is bifurcated and receives between its limbs the actuating lever 7 which is pivoted to the yoke via a pintle 20 spanning these limbs and defining a pivotal axis for the lever which extends parallel to the braking surfaces 2a, 2b of the brake disk 2. The short lever arm 21 of actuating lever 7 is formed with a spheroidal seat 21a in which the self-extensible slack compensating transmission element 9 is received, the latter bearing against the backing plate 19′ of the movable brake shoe 4′ via an intervening plate 22. When the actuating lever 7 is swung in the clockwise direction (FIG. 2), by either hydraulic assembly 12 or manually operable means such as a cable connected with the free extremity of this lever, the transmission element 9 urges the movable brake shoe 4′ in the direction of brake surface 2b until it engages the latter, the brake disk 2 being then shifted along shaft 1 until its surface 2a engages the stationary brake shoe 4. The frictional engagement of the brake shoes 4, 4′ with the braking surfaces 2a, 2b ing plate 19′. When the lever 7 is swung in the clockstationary brake portions 5, 6. The shaft-confronting convex lower edge 23 of each brake shoe 4, 4′ is so rounded that, upon at least partial extraction of one of the pins 17, the brake shoes can be swung out for purposes of inspection about the pivot axis defined by the other pin. Withdrawal of this other pin enables complete removal of the brake shoes.

The rounded edge 23 of each shoe enables the latter to clear the shaft 1 or the bight portion 11 of the yoke when the shoe is to be slid out of its mounting upon removal of both pins 17. The restoring spring 8, tensioned upon displacement of the actuating lever 7 in the clockwise direction, restores it in the counterclockwise sense subsequent to the braking action.

Figure 1:
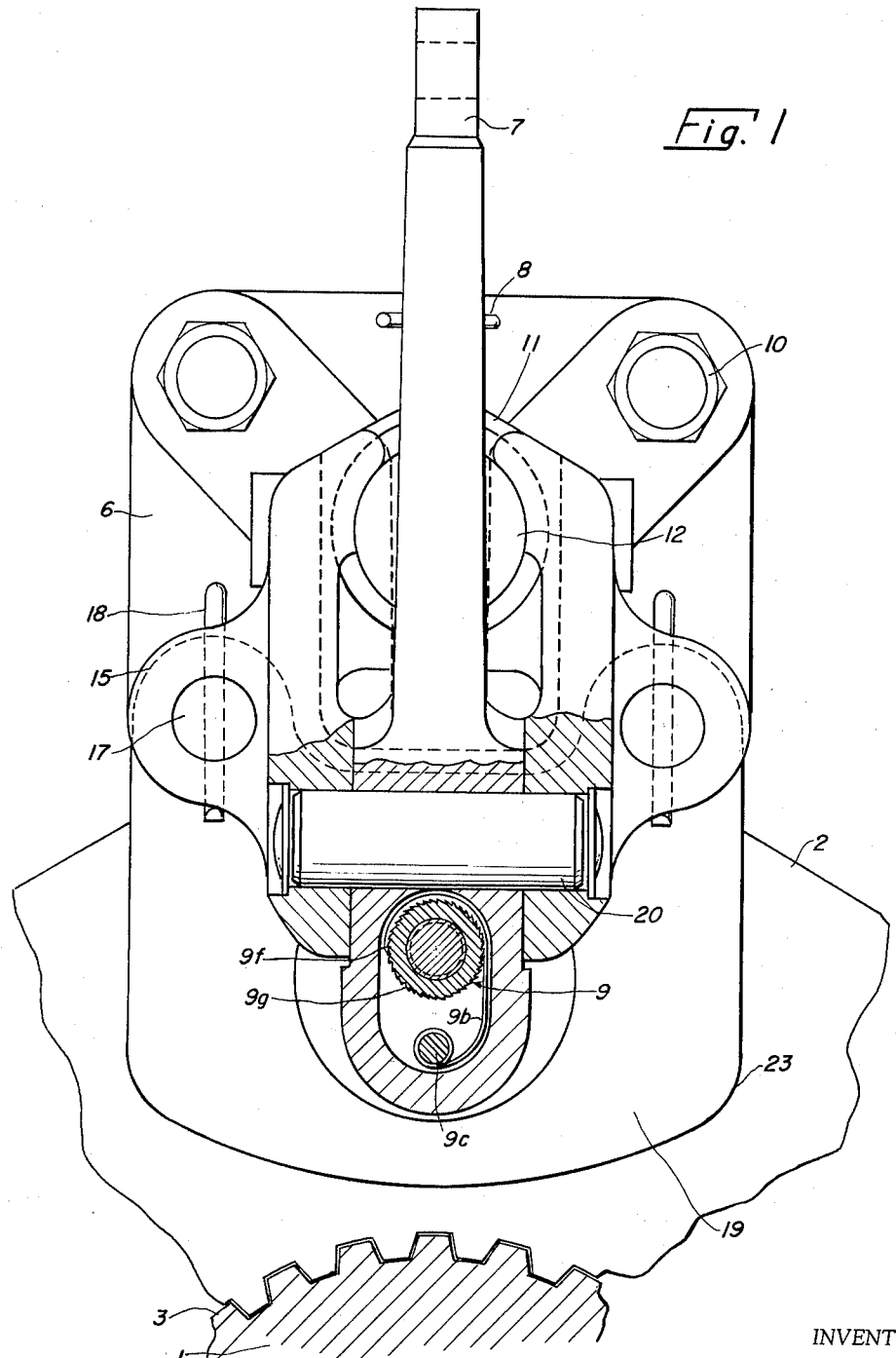
FIG. 1 is a plan view of the disk brake, with parts broken away.

Advantageously, the brake is provided with an adjusting means for automatically compensating for brake wear. This adjusting means is best shown in FIGS. 1 and 2 and consists of the slack compensating element 9 made up of a threaded stud 9e lodged in plate 22 and threadedly engaged by a thimble 9a whose domed portion 9d is slidably received in the seat 21a. The thimble 9a is toothed at 9g and thus constitutes a ratchet engaged by a spring pawl 9b fastened to the short arm 21 of lever 7 via a screw 9c. The self-extensible transmission element 9 thus bears against the rear surface 19a of backing plate 19. When the lever 7 is swung in the clockwise sense about its pintle 20, pawl spring 9b shifts with respect to the thimble 9a to withdraw its finger 9f from the serration 9g so as to let it skip one or more teeth, depending upon the degree of displacement of lever 7, until shoe 4′ engages the disk 2 and the latter bears against shoe 4. Upon displacement of lever 7 in the counterclockwise sense, the finger 9f steps the thimble 9a by a corresponding number of teeth to elongate the assembly constituted by the threaded stud 9b and the thimble 9a.

The invention described and illustrated is believed to admit of many modifications within the ability of persons skilled in the art, all such modifications being considered within the spirit and scope of the appended claims.

I claim:
1. A disk brake, comprising:
a support;
a shaft journalled on said support for rotation about an axis;
a brake disk keyed to said shaft for axial displacement relatively thereto and rotatable entrainment thereby about said axis while having a pair of opposite braking surfaces extending generally transversely thereto;
a yoke rigid with said support extending around the outer periphery of said disk;
a pair of brake shoes extending within said yoke parallel to said surfaces on opposite sides of said disk and juxtaposed with respective ones of said braking surfaces for frictional engagement therewith;
a pair of generally parallel spaced-apart pins removably mounted in said yoke and extending parallel to said axis outwardly of the periphery of said disk while projecting axially beyond said surfaces, each of said brake shoes lying radially inwardly of said pins with respect to said axis in sliding engagement with said pins and being constrained thereby to move in a direction perpendicular to said surfaces, said shoes being withdrawable from said yoke in a direction transverse to said axis upon removal of said pins, at least one of said pins defining a pivotal axis parallel to the axis of rotation of said disk whereby said shoes can be swung out of said yoke about said pivotal axis upon at least partial removal of the other of said pins, said yoke having a bight portion disposed radially outwardly of said pins, said shoes being dimensioned to clear said bight portion and said shaft upon swinging movement about said pivotal axis; and
actuating means on said yoke for displacing one of said brake shoes into engagement with the respective surface and said brake disk into engagement with the other of said shoes in said direction perpendicular to said surfaces, said actuating means including a lever pivotally mounted on said yoke for rotation about an axis parallel to said surfaces, a slack-compensating transmission element interposed between said lever and said one of said brake shoes, and fluid-operated means in said bight portion of said yoke for displacing said lever.

2. A disk brake, comprising:
a support;
a shaft journaled on said support for rotation about an axis;
a brake disk keyed to said shaft for axial displacement relatively thereto and rotatable entrainment thereby about said axis while having a pair of opposite braking surfaces extending generally transversely thereto;
a yoke rigid with said support extending around the outer periphery of said disk;
a pair of brake shoes extending within said yoke parallel to said surfaces on opposite sides of said disk and juxtaposed with respective ones of said braking surfaces for frictional engagement therewith;
a pair of generally parallel spaced-apart pins removably mounted in said yoke and extending parallel to said axis outwardly of the periphery of said disk while projecting axially beyond said surfaces, said yoke being provided with two pairs of spaced-apart lugs on respective sides of said disk, corresponding lugs on opposite sides of said disk being provided with aligned bores receiving respective ones of said pins, each of said brake shoes lying radially inwardly of said pins with respect to said axis in sliding engagement with said pins and being constrained thereby to move in a direction perpendicular to said surfaces, said shoes being withdrawable from said yoke in a direction transverse to said axis upon removal of said pins, at least one of said pins defining a pivotal axis parallel to the axis of rotation of said disk whereby said shoes can be swung out of said yoke about said pivotal axis upon at least partial removal of the other of said pins, said yoke having a bight portion disposed radially outwardly of said pins, said shoes being dimensioned to clear said bight portion and said shaft upon swinging movement about said pivotal axis; and actuating means on said yoke for displacing one of said brake shoes into engagement with the respective surface and said brake disk into engagement with the other of said shoes in said direction perpendicular to said surfaces, said actuating means including a lever pivotally mounted on said yoke for rotation about an axis parallel to said surfaces, a slack compensating transmission element interposed between said lever and said one of said brake shoes, and fluid-operated means in said bight portion of said yoke for displacing said lever.

3. A disk brake, comprising:
a support;
a shaft journalled on said support for rotation about an axis;
a brake disk keyed to said shaft for axial displacement relatively thereto and rotatable entrainment thereby about said axis while having a pair of opposite braking surfaces extending generally transversely thereto;
a yoke rigid with said support extending around the outer periphery of said disk;
a pair of brake shoes extending within said yoke parallel to said surfaces on opposite sides of said disk and juxtaposed with respective ones of said braking surfaces for frictional engagement therewith;
a pair of generally parallel spaced-apart pins removably mounted in said yoke and extending parallel to said axis outwardly of the periphery of said disk while projecting axially beyond said surfaces, each of said brake shoes lying radially inwardly of said pins with respect to said axis in sliding engagement with said pins and being constrained thereby to move in a direction perpendicular to said surfaces, said shoes being withdrawable from said yoke in a direction transverse to said axis upon removal of said pins, said yoke having a bight portion disposed radially outwardly of said pins; and
actuating means on said yoke for displacing one of said brake shoes into engagement with the respective surface and said brake disk into engagement with the other of said shoes in said direction perpendicular to said surfaces, said actuating means including a lever pivotally mounted on said yoke for rotation about an axis parallel to said surfaces, and fluid-operated means including a cylinder in said bight portion of said yoke for displacing said lever;
said lever being disposed midway between said pins in alignment with said cylinder, said shoes having pin-engaging portions flanking said cylinder and further having a shaft-confronting edge of convex curvature for facilitating the withdrawal of said pin-engaging portions.

4. A disk brake, comprising:
a support;
a shaft journaled on said support for rotation about an axis;
a brake disk keyed to said shaft for axial displacement relatively thereto and rotatable entrainment thereby about said axis while having a pair of opposite braking surfaces extending generally transversely thereto;
a yoke rigid with said support extending around the outer periphery of said disk;
a pair of brake shoes extending within said yoke parallel to said surfaces on opposite sides of said disk and juxtaposed with respective ones of said braking surfaces for frictional engagement therewith;
a pair of generally parallel spaced-apart pins removably mounted in said yoke and extending parallel to said axis outwardly of the periphery of said disk while projecting axially beyond said surfaces, said yoke being provided with two pairs of spaced-apart lugs on respective sides of said disk, corresponding lugs on opposite sides of said disk being provided with aligned bores receiving respective ones of said pins, each of said brake shoes lying radially inwardly of said pins with respect to said axis in sliding engagement with said pins and being constrained thereby to move in a direction perpendicular to said surfaces, said shoes being withdrawable from said yoke in a direction transverse to said axis upon removal of said pins, said yoke having a bight portion disposed radially outwardly of said pins; and
actuating means on said yoke for displacing one of said brake shoes into engagement with the respective surface and said brake disk into engagement with the other of said shoes in said direction perpendicular to said surfaces, said actuating means including a lever pivotally mounted on said yoke for rotation about an axis parallel to said surfaces, a slack-compensating transmission element interposed between said lever and said one of said brake shoes, and fluid-operated means in said bight portion of said yoke for displacing said lever.

5. A disk brake as defined in claim 4 wherein said fluid-operated means includes a cylinder and wherein said lever is disposed midway between said pins in alignment with said cylinder, said shoes having pin-engaging portions flanking said cylinder and further having a shaft-confronting edge of convex curvature for facilitating the withdrawal of said pin-engaging portions.

References Cited by the Examiner

UNITED STATES PATENTS

| 2,669,327 | 2/1954 | Chamberlain et al. | 188—72 |
| 2,781,106 | 2/1957 | Lucien | 188—73 X |
| 2,820,530 | 1/1958 | Chouings et al. | 188—73 |
| 2,940,554 | 6/1960 | Cameron | 188—196 X |
| 3,111,198 | 11/1963 | Hodkinson | 188—72 |
| 3,132,724 | 5/1964 | Ansteth | 188—73 |

FOREIGN PATENTS 785,367 10/1957 Great Britain.

MILTON BUCHLER, *Primary Examiner.*

G. E. A. HALVOSA, *Assistant Examiner.*